United States Patent
Jenkner et al.

(12) 
(10) Patent No.: US 6,361,871 B1
(45) Date of Patent: Mar. 26, 2002

(54) COMPOSITION OF ORGANOFLUORINE-FUNCTIONAL SILANES AND/OR SILOXANES, PROCESS FOR PREPARING IT AND ITS USE

(75) Inventors: Peter Jenkner, Rheinfelden; Roland Edelmann, Wehr; Albert-Johannes Frings; Michael Horn, both of Rheinfelden; Ralf Laven, Schworstadt; Helmut Mack; Jaroslaw Monkiewicz, both of Rheinfelden; Burkhard Standke, Lorrach, all of (DE)

(73) Assignee: Degussa AG, Deusseldorf (DE)

( * ) Notice: Subject to any disclaimer, the term of this patent is extended or adjusted under 35 U.S.C. 154(b) by 0 days.

(21) Appl. No.: 09/495,312

(22) Filed: Feb. 1, 2000

(30) Foreign Application Priority Data

Feb. 3, 1999 (DE) .......................... 199 04 132

(51) Int. Cl.[7] .............................. B32B 27/28
(52) U.S. Cl. ...................... 428/447; 428/411.1; 528/36; 528/16; 528/18; 528/17; 528/12; 528/42; 556/458; 524/858; 427/387
(58) Field of Search .............................. 428/447, 411.1; 528/36, 16, 18, 17, 12, 42; 556/458; 524/858; 427/387

(56) References Cited

U.S. PATENT DOCUMENTS

| 5,266,358 A | 11/1993 | Uemura et al. |
| 5,459,198 A | * 10/1995 | Sharp |
| 5,580,819 A | 12/1996 | Li et al. |

FOREIGN PATENT DOCUMENTS

| DE | 196 46 662 | 5/1997 |
| EP | 0 207 282 | 1/1987 |
| EP | 0 513 727 | 11/1992 |
| EP | 0 748 659 | 12/1996 |
| EP | 0 799 873 | 10/1997 |
| EP | 0 826 748 | 3/1998 |
| EP | 0 846 716 | 6/1998 |
| JP | 1-068477 | 3/1989 |

* cited by examiner

*Primary Examiner*—Robert Dawson
*Assistant Examiner*—Kuo-Liang Peng
(74) *Attorney, Agent, or Firm*—Oblon, Spivak, McClelland, Maier & Neustadt, P.C.

(57) ABSTRACT

A composition comprising at least one organofluorine-functional silane and/or siloxane, at least one mineral acid and at least one metal salt of aluminum(III), tin(II), tin(IV), iron(III) or titanium(III); a process for preparing said composition and to its use; and surface-modified substrates obtainable by coating with said composition.

20 Claims, No Drawings

COMPOSITION OF ORGANOFLUORINE-FUNCTIONAL SILANES AND/OR SILOXANES, PROCESS FOR PREPARING IT AND ITS USE

BACKGROUND OF THE INVENTION

1. Field of the Invention

The present invention relates to a composition comprising at least one organofluorine-functional silane and/or siloxane, to a process for preparing it and to its use and also to correspondingly surface-modified substrates.

2. Discussion of the Background

It is known to prepare a composition comprising at least one organofluorine-functional silane and/or siloxane by mixing, by controlled acid- or base-regulated hydrolysis, or by condensation or cocondensation of organofluorine-functional chlorosilanes and/or alkoxysilanes, with or without further precursor components. Besides organic or inorganic acids or bases, pH regulation in this case is carried out using acidic or basic salts, such as alkali metal carbonate, alkali metal hydrogen sulfate, alkali metal dihydrogen phosphate, magnesium hydroxide or aluminum acetate. In the preparation of the compositions it is also known, for example, to employ other hydrolyzable organosilanes, silicon, titanium or zirconium tetrachlorides, or corresponding metal-acid esters as precursor components.

Compositions of this kind, containing water, solvent or dispersant, are generally employed for giving substrates a hydrophobic and at the same oleophobic and dirt-repellent finish, or else, for example, a hydrophilic finish, or for the special modification of the surface properties of the substrates, for example, for metals, metal oxides, fillers, pigments, glass, enamel, ceramic, construction materials, buildings, fibers, textiles, natural substances, plastics, and coating materials. This modification may involve the formation of a protective layer against UV radiation or mechanical, thermal and chemical influences. Furthermore, scratch proofing, anticorrosive, antiicing, antifouling, antibacterial or antithrombic properties may also be obtained. Besides the organic functional groups, said silane and/or siloxane systems generally possess Si-bonded hydroxyl and/or alkoxy groups, which are intended to permit subsequent attachment to the substrate. However, it is often difficult to achieve satisfactory and permanent attachment of the coating to the substrate.

DE 196 46 662 A1 describes the treatment of a metal surface with an $SnCl_2$ solution followed by application of amino-functional alkoxysilanes, giving coatings resistant to moisture and corrosion.

Stable hydrophobic coatings on steel can be prepared by combining alkoxides, methyl alkoxides, such as $Al(CH_3)(OC_2H_5)_2$, or acetonates of the metals Al. Zr, Ti, Si, W, Ce, Y or Sn with fluoroalkylalkoxysilanes, as is disclosed, for example, in JP 1068477. Similarly, in accordance with JP 4136181, nonmetals can also be given permanent hydrophobicization.

Finally, EP 0 799 873 A1 discloses the preparation of water- and oil-repellent coatings by application of a composition comprising an aqueous solvent, such as alcohol, a fluorinated alkoxysilane, and a Brönsted acid and/or Brönsted base catalyst.

SUMMARY OF THE INVENTION

It is an object of the present invention to provide a composition having improved adhesion properties and crosslinking properties on a polar substrate surface and, therefore, better coating properties.

This object is achieved in accordance with the invention as specified in the claims.

It has surprisingly been found that a highly reactive composition comprising organofluorine-functional silanes and/or siloxanes which carry some silanol groups in addition to hydrolyzable groups is obtained by mixing at least one organofluorine-functional chlorosilane or alkoxysilane and, optionally, further organofunctional, hydrolyzable silanes, such as organochloro- or organoalkoxysilanes, in the presence of a small amount of water and in the presence of at least one metal salt of aluminum(III), tin(II), tin(IV), iron (III) or titanium(III) and at least one mineral acid, suitably in an organic solvent or dispersant, such as in an alcohol, and subjecting this mixture, optionally, to partial hydrolysis and, optionally, to condensation or oligomerization.

DETAILED DESCRIPTION OF THE INVENTION

By applying the present composition to a substrate it is possible, surprisingly and advantageously, to obtain a particularly well-adhering and permanent coating. In general, the reactive Si compounds in the composition are in the form of reactive monomeric units. Compositions of the invention can, however, also be formulated so that oligomeric Si compounds predominate.

Furthermore, despite their high reactivity, compositions of the invention are, surprisingly, stable for relatively long periods, generally more than 5 months. In addition, the composition of the invention is immediately ready to use and is comparatively simple to apply, for example, by dipping, spraying or polishing, since the composition obtained in accordance with the invention is notable for a particularly rapid and complete reaction with a polar surface. In general, application of the composition of the invention immediately produces a homogeneous, highly crosslinked coating which, depending on the functionality of the organic groups, is outstandingly suited to the full and permanent, chemically bonded, organic modification of polar substrate surfaces. In this context, said metal salts act in conjunction with said mineral acids as catalyst.

The present invention therefore provides a composition comprising at least one organofluorine-functional silane and/or siloxane, at least one mineral acid, and at least one metal salt of aluminum(III), tin(II), tin(IV), iron(III) or titanium(III).

The metal salt content of the composition of the invention is preferably from 0.01 to 10% by weight, especially from 0.01 to 1% by weight, based on the composition.

The composition of the invention also includes as mineral acid preferably hydrogen chloride, nitric acid, phosphoric acid or sulfuric acid, the mineral acid content preferably being from 0.001 to 5% by weight, especially from 0.01 to 1% by weight and, with very particular preference, from 0.05 to 0.5% by weight, based on the composition.

The composition of the invention suitably includes a solvent and/or dispersant. For example, it may include an aromatic hydrocarbon or an aliphatic hydrocarbon or an alcohol or water, or a mixture thereof. Methanol, ethanol, n-propanol, isopropanol, n-butanol, acetone, cyclohexane, n-hexane or toluene, in particular, can be employed advantageously as solvent. In general, the amount of solvent and/or dispersant makes up the sum of the components of the composition of the invention—organosilanes and/or organosiloxanes, mineral acid, metal salt and, optionally, water—to 100%.

Compositions of the invention preferably comprise those silanes and/or siloxanes which comprise organofluorine-functional groups, especially fluoroalkyl-functional groups of the formula $CF_3(CF_2)_m(CH_2)_n$— where m=0 to 18 and n=0 or 2, examples being tridecylfluorooctyl $\{(C_6F_{13})$—$(CH_2)_2$—$\}$, heptadecafluoro-decyl $\{(C_8F_{17})$—$(CH_2)_2$—$\}$, nonafluorohexyl $\{(C_4F_9)$—$(CH_2)_2$—$\}$, heneicosafluorodecyl $\{(C_{10}F_{21})$—$(CH_2)_2$—$\}$, 3,3,3-trifluoropropyl $\{(CF_3)$—$(CH_2)_2$—$\}$ or 3-(1,1,2,2-tetrafluoro-ethoxy)propyl $\{(HC_2F_4)$—O—$(CH_2)_3$—$\}$ groups, optionally, aminoalkyl groups, examples being 3-aminopropyl, N-2-aminoethyl-3-aminopropyl or N-2-aminoethyl-N'-2-aminoethyl-3-aminopropyl, and also vinyl groups, methacryloxyalkyl groups, an example being 3-methacryloxypropyl, and also alkyl groups, examples being methyl, propyl, isopropyl, n-butyl, isobutyl, t-butyl, n-pentyl, n-hexyl, n-octyl, isooctyl and hexadecyl, or cycloalkyl groups, examples being cyclopentyl and cyclohexyl, or cycloalkylene groups, examples being cyclohexenyl, cyclooctenyl and cyclododecadienyl groups, and also epoxyalkyl and epoxycycloalkyl groups, such as 3-glycidyloxypropyl or 2,3-epoxycyclohexyl groups, the siloxane containing not more than one of said organofunctional groups attached to one silicon, whose other valences are occupied by —O—Si bonds or OH groups and, optionally, by alkoxy groups or chloro substituents.

The present invention additionally provides a process for preparing a composition of the invention by mixing, optionally partially hydrolyzing, and, optionally, condensing at least one organofluorine-functional silane and, optionally, further organofunctional silanes in the presence of water, at least one mineral acid and at least one metal salt of aluminum(III), tin(II), tin(IV), iron(III) or titanium(III).

The amount of water present in the process of the invention is, suitably, low. The amount of water in this case is preferably from 1 ppm by weight to 2% by weight, more preferably from 10 ppm by weight to 1.5% by weight, with very particular preference from 0.01 to 1% by weight and, with special preference, from 0.05 to 0.3% by weight, the figures for the amount of water being based on the amount of silanes employed and including water of crystallization.

In the process of the invention, the silanes to be mixed or hydrolyzed, and, optionally, condensed are suitably introduced initially, as a mixture, and the metal salt, mineral acid and, optionally, water components are added simultaneously or successively to this initial charge.

Mixing, hydrolysis or condensation of the silanes employed is suitably conducted in a solvent or dispersant. In particular, an aromatic hydrocarbon, such as toluene, or an aliphatic hydrocarbon, such as cyclohexane, or an alcohol, such as methanol or ethanol or isopropanol, or a mixture thereof can be used for this purpose. This generally produces clear, stable solutions or metastable dispersions, which are normally stable for longer than 5 months on storage.

In the process of the invention it is preferred to employ the following silanes:

organofluorine-functional silanes of the general formula (I)

$$F_3C(CF_2)_m(CH_2)_nSiR^1{}_yX_{(3-y)} \quad (I)$$

in which X is chloro or a group RO and R is a linear or branched alkyl radical of 1 to 4 carbon atoms, $R^1$ is a linear, branched or cyclic alkyl group of 1 to 8 carbon atoms, n=0 or 2, y=0 or 1 or 2 and m=0 to 18, such as 3,3,4,4,5,5,6,6,7,7,8,8,8-tridecafluorooctyl-trimethoxysilane, 3,3,4,4,5,5,6,6,7,7,8,8,8-tridecafluorooctyl-trichlorosilane, 3,3,4,4,5,5,6,6,7,7,8,8-tridecafluorooctyltriethoxysilane, 3,3,4,4,-5,5,6,6,7,7,8,8,9,9,10,10,10-heptadecafluorodecyl-triethoxysilane, 3,3,4,4,5,5,6,6,7,7,8,8,9,9,-10,10,10-heptadecafluorodecyl-trichlorosilane, 3,3,-4,4,5,5,6,6,7,7,8,8,9,9,10,10,10-heptadecafluoro-decyltrimethoxysilane, 3,3,4,4,5,5,6,6,6-nonafluoro-hexyltriethoxysilane, 3,3,4,4,5,5,6,6,6-nonafluoro-hexyltrimethoxysilane, 3,3,4,4,5,5,6,6,6-nonafluoro-hexyltrichlorosilane, 3,3,4,4,5,5,6,6,7,7,8,8,9,9,10,10,10,11,11,12,12,12-heneicosafluorododecyltri-ethoxysilane, 3,3,3-tri-fluoropropyltrichlorosilane, 3,3,3-trifluoropropyltrimethoxysilane, 3,3,3-trifluoropropyltriethoxysilane or 3-(1,1,2,2-tetra-fluoroethoxy)propyltrimethoxysilane or 3-(1,1,2,2-tetrafluoroethoxy)propyltrichlorosilane and, optionally, further silanes, examples being:

amino-functional organosilanes, such as 3-aminopropyltriethoxysilane, 3-aminopropyltrimethoxysilane, 2-aminoethyl-3-aminopropyltrimethoxysilane, N-2-aminoethyl-N'-2-aminoethyl-3-aminopropyltrimethoxysilane, bis(3-triethoxysilylpropyl)amine, and bis(3-trimethoxysilylpropyl)amine, epoxy-functional organosilanes, such as 3-glycidyloxypropyltrimethoxysilane, 3-glycidyloxypropyltriethoxysilane, and 2-(2,3-epoxycyclohexyl)ethyltrimethoxysilane, alkylsilanes, such as methyltrichlorosilane, methyltrimethoxysilane, methyltriethoxysilane, n-propyltriethoxysilane, isopropyltrimethoxysilane, octyltrichlorosilane, octyltriethoxysilane, isooctyltrimethoxysilane, hexedecyltrimethoxysilane, and octadecyltrichlorosilane, cycloalkylsilanes, such as cyclohexyltrimethoxysilane, cyclopentyltri-chlorosilane, and cyclohexyltriethoxysilane, cycloalkenylsilanes, such as cyclohexenylethyl-triethoxysilane, cyclododecadienyltrichlorosilane, cyclooctenyltrimethoxysilane, and also tetraethoxysilane and also vinyltrimethoxysilane, vinyl triethoxysilane, vinyltris(methoxyethoxy)silane or 3-methacryloxypropyltrimethoxysilane and 3-methacryloxypropyltriethoxysilane.

Furthermore, the respective silanes can be employed with one another in various proportions and also with the same functionalities or with two or more different functionalities. Preferably, the amount of organofluorine-functional silanes and/or organofluorine-functional siloxanes in the composition of the invention is adjusted to from 0.01 to 10% by weight, more preferably from 0.1 to 5% by weight and, with very particular preference, from 0.25 to 3% by weight, based on the composition.

In the process of the invention, moreover, the metal salt is preferably employed in solid or liquid or dissolved form. The metal salt employed is suitably a chloride, nitrate, sulfate, hydrogen sulfate, phosphate, hydrogen phosphate or dihydrogen phosphate. Particularly preferred metal salts are metal chlorides -especially aluminum(III) chloride, tin(II) chloride, tin(IV) chloride, titanium(III) chloride and iron (III) chloride. The metal salt is suitably employed in an amount of from 0.01 to 10% by weight, based on the finished composition.

The mineral acid employed in the process of the invention is preferably hydrogen chloride, nitric acid, phosphoric acid or sulfuric acid in an amount, based on the molar mass of the mineral acid and on the subsequent composition, of suitably from 0.001 to 5% by weight. The mineral acid can be employed in concentrated or aqueous form.

In general, the process of the invention is conducted as follows:

Generally, the silane is introduced initially. It is also possible to add the solvent and/or dispersant. Subsequently, the metal salt, mineral acid and, optionally, water components are added, suitably with thorough mixing. Alternatively, the components can be added either simultaneously or successively to an undiluted or partially hydrolyzed silane or mixture of silanes. Mixing, reaction and aging take place in general under an inert gas blanket at a temperature from 10 to 40° C. for from ½ to 72 hours, preferably at room temperature (from 15 to 25° C.) for a period of from 1 to 24 hours, with particular preference for from 5 to 12 hours. The aging of the mixture can suitably take place with stirring. Alternatively, the preparation can be conducted at a temperature of up to 50° C. with or without the use of a stirrer and a condenser, over a period of from ¼ to 24 hours. The resulting composition can be diluted by adding a solvent or dispersant.

The metal salt employed normally remains in the composition of the invention and so, when the composition of the invention is used, the catalyst present supports in particular the attachment and condensation of the silane and/or siloxane to the substrate surface, in a surprisingly good and thus advantageous manner.

The composition of the invention obtained as described above can be applied to substrates or workplaces by dipping, polishing, spraying or brushing, the thickness of the coating having no particular limitation but being preferably between 0.1 nm and 1000 μm, more preferably between 0.5 and 50 nm and, with very particular preference, between 1 and 15 nm. The treatment time is generally from a few seconds up to about 1 hour, preferably from about 1 to 20 minutes, the duration being critical in some cases for the homogeneity of the coating but generally not for its thickness. Treatment may be followed by a drying time of from 10 seconds to 3 hours at temperatures from 20 to 200° C. Drying normally takes place at from 80 to 150° C. over a period of from 5 to 20 minutes. The drying operation can be conducted in air, in vacuo, or under an inert gas, such as argon or nitrogen. Examples of preferred substrates that may be used are wood, natural fibers, metals, metal oxides, glass, ceramic, enamel, plastics, stone, synthetic stone, marble, concrete or bitumen.

The present invention therefore also provides for the use of a composition of the invention for coating surfaces, preferably polar surfaces. Examples of such polar substrates are glasses, such as quartz glass or borosilicate glass, metals, such as steel, copper, silver, aluminum, or alloys, such as brass, porcelain, clinker, enamel, minerals, and natural substances, such as silk, sisal or hemp.

Surfaces of plastic with polar functionalities, such as in the case, for example, of polyamide, polycarbonate, phenolic, furan and epoxy resins, polystyrene or polyesters, can likewise be permanently modified. The high degree of crosslinking achievable, furthermore, enables substantially apolar substrate surfaces, such as in the case, for example, of polypropylene, polyethylene or polymethyl methacrylate, to be given a stable coating.

The present invention provides, furthermore, surface-modified substrates obtainable by coating with the composition of the invention. Such surface modified substrates preferably have a coating with a thickness of from 0.1 nm to 1000 μm, more preferably from 0.1 to 500 nm.

Surface-modified substrates obtained in accordance with the invention are also notable outstandingly for excellent water, moisture, heat, acid and alkali resistance and for their UV stability. The adhesion of the coating to the substrate is generally outstanding provided that the development of chemical bonds to the surface is possible in principle, and is also long lasting and likewise combines excellent mechanical strength with flexibility and elasticity.

Having generally described this invention, a further understanding can be obtained by reference to certain specific examples which are provided herein for purposes of illustration only and are not intended to be limiting unless otherwise specified.

EXAMPLE A

Preparation of Alkylsilane-based Compositions

No. 1 Comparative Example 5.0 g of DYNASYLAN® OCTEO (octyltriethoxysilane) and 5.0 g of $H_2O$ containing acetic acid (pH=2.5; 19.3 g of distilled water) are mixed with 0.7 g of 100% strength acetic acid and 490.0 g of ethanol and the mixture is stirred in a glass flask at room temperature for 5 hours. The composition corresponds to 1.0% by weight DYNASYLAN® OCTEO, 1.0% by weight $H_2O$ (pH=2.5) and 98.0% by weight ethanol.

No. 2 Comparative Example 5.0 g of DYNASYLAN® OCTEO (octyltriethoxysilane), 1.0 g of hydrochloric acid (37% by weight HCl/63% by weight $H_2O$), 493.5 g of ethanol and 0.5 g of $SnCl_2 \times 2H_2O$ are stirred in a glass flask at room temperature for 5 hours. The composition corresponds to 1.0% by weight DYNASYLAN® OCTEO, 0.126% by weight $H_2O$, 0.074% by weight HCl (absolute), 0.1% by weight $SnCl_2 \times 2H_2O$ and 98.7% by weight ethanol.

No. 3 Comparative Example 5.0 g of DYNASYLAN® OCTEO (octyltriethoxysilane), 1.0 g of hydrochloric acid, 493.5 g of isopropanol and 0.5 g of $SnCl_2 \times 2H_2O$ are stirred in a glass flask at room temperature for 5 hours (aging time). The composition corresponds to 1.0% by weight DYNASYLAN® OCTEO, 0.126% by weight $H_2O$, 0.074% by weight HCl (absolute), 0.1% by weight $SnCl_2 \times 2H_2O$ and 98.7% isopropanol.

Treatment of Glass Window Panes

Coating Operation

The formulations are employed directly after the aging time. The panes of glass are cleaned initially with isopropanol and then treated with formulations 1 and 2 by dipping for 20 minutes. The pane with the formulation 3 is coated on both sides by polishing for 2 minutes. After the excess solution has drained off (about 1 minute) the panes are after treated in a drying cabinet at 150° C. for 1 h.

Checking of the Water Resistance

The coated panes of glass are boiled in distilled water for 5 h.

The hydrophobic/oleophobic properties are examined by measuring the static wetting angle (DIN EN 828 "Wettability: Determination by measurement of the contact angle and the critical surface tension of solid surfaces"). The wetting angles are measured a number of times at different points on both surfaces (air side/tin side); as shown below in Table 1.

TABLE 1

Comparative summary of the coating experiments relating to Examples A1 to A3

| Glass window pane (Composition No.) | Mean static wetting angle ($H_2O$) before boiling test {°} | Mean static wetting angle ($H_2O$) after 5-h boiling test {°} |
|---|---|---|
| (No. 1) {dipped} | 75 to 81 → 78 | 60 to 66 → 63 |
| (No. 2) {dipped} | 96 to 106 → 101 | 68 to 66 → 67 |
| (No. 3) {polished} | 94 to 97 → 96 | 65 to 72 → 69 |

EXAMPLE B

Preparation of a Fluoroalkylsilane-based Composition

No. 4

5.0 g of DYNASYLAN® F 8261 (3,3,4,4,5,5,6,6,7,7,8,8,8-tridecafluorooctyl-triethoxysilane), 1.0 g of hydrochloric acid (37% HCl/63% $H_2O$), 5 g of water, 488.4 g of ethanol and 0.6 g of $SnCl_2 \times 2H_2O$ are stirred in a glass flask at room temperature for 5 h (aging time). The composition corresponds to 1.0% by weight DYNASYLAN® F 8261, 1.126% by weight $H_2O$, 0.074% by weight HCl (absolute), 0.12% by weight $SnCl_2 \times 2H_2O$ and 97.68% by weight ethanol.

Treatment of Untreated Polystyrene Plates, Polyester Resin, Glazed Porcelain and Enameled Metal Plates Coating Operation The solution is used after a standing period of 24 h. The substrates are cleaned with isopropanol and the formulation is applied with a paper cloth (polystyrene) or by dipping for 5 minutes (metal plate). This is followed in the case of polystyrene by after treatment in a drying cabinet at 80° C. for 1 h; the enameled metal plates are dried at 50° C. for 1 h.

Checking of the Water Resistance

The coated plates are boiled in distilled water for 5 h. The hydrophobic/oleophobic properties are examined by measuring the static wetting angle. The wetting angles are measured a number of times at different points on both surfaces; as shown below in Table 2.

TABLE 2

Comparative summary of the coating experiments relating to Example B4

| Substrate (Composition No.) | Mean static wetting angle ($H_2O$) before boiling test {°} | Mean static wetting angle ($H_2O$) after 5-h boiling test {°} |
|---|---|---|
| Polystyrene, untreated | 61 | <60 |
| Polystyrene, (No. 4) | 94 | 98 |
| Polyester, untreated | 98 | — |
| Polyester (No. 4) | 98 | 97 |
| Porcelain, untreated | 41 | — |

TABLE 2-continued

Comparative summary of the coating experiments relating to Example B4

| Substrate (Composition No.) | Mean static wetting angle ($H_2O$) before boiling test {°} | Mean static wetting angle ($H_2O$) after 5-h boiling test {°} |
|---|---|---|
| Porcelain (No. 4) | 92 | 105 |
| Enamel, untreated | 12 | <12 |
| Enamel (No. 4) | 95 | 93 |

EXAMPLE C

Preparation of a Fluoroalkylsilane-based Composition

No. 5a 5.0 g of DYNASYLAN® F 8261 (3,3,4,4,5,5,6,6,7,7,8,8,8-tridecafluorooctyl-triethoxysilane), 1.0 g of hydrochloric acid (37% by weight HCl/63% by weight $H_2O$), 493.5 g of isopropanol and 0.5 g of $SnCl_2 \times 2H_2O$ are stirred in a glass flask at room temperature for 3 h (aging time). The composition corresponds to 1.0% by weight DYNASYLAN® F 8261, 0.126% by weight $H_2O$, 0.074% by weight HCl (absolute), 0.1% by weight $SnCl_2 \times 2H_2O$ and 98.7% by weight isopropanol.

No. 5b Comparative Example

For comparison and as a standard without metal salt and mineral acid, use is made of DYNASYLAN® F 8261, 1% strength in isopropanol, hydrolyzed beforehand with 1% by weight $H_2O$ (pH 2.5; acidified with acetic acid).

Treatment of Glass Window Panes and Polyacrylic Glass Plates

Coating Operation

The solution is used after a standing period of 72 h. The substrates are cleaned with isopropanol and the formulation is applied for 1 minute in each case using a paper cloth. The coated samples are stored at room temperature for 1 day; there is no aftertreatment.

Checking of the Water Resistance

The coated panes/plates are boiled in distilled $H_2O$ for 5 h.

The hydrophobic/oleophobic properties are checked by measuring the static wetting angle. The wetting angles are measured a number of times at different points on both surfaces, as shown below in Table 3.

TABLE 3

Comparative summary of the coating experiments relating to Examples C5

| Substrate (Composition No.) | Mean static wetting angle ($H_2O$) before boiling test {°} | Mean static wetting angle ($H_2O$) after 5-h boiling test {°} |
|---|---|---|
| Window glass, untreated | 17 | 17 |
| Window glass (No. 5a) | 98 to 103 → 101 | 81 to 95 → 88 |
| Window glass (No 5b) | 85 | 44 |
| Polyacrylate, untreated | 75 | 72 |
| Polyacrylate (No. 5a) | 94 | 85 |

EXAMPLE D

Preparation of a Fluoroalkvisilane-based Composition

No. 6 Comparative Example 2.5 g of DYNASYLAN® F 8261 (3,3,4,4,5,5,6,6,7,7,8,8,8-tridecafluorooctyl-triethoxysilane), 244.7 g of ethanol and 0.3 g of $SnCl_2 \times 2H_2O$ are stirred in a glass flask at room temperature for 1 h. The composition corresponds to 1.0% by weight DYNASYLAN® F 8261, 0.12% by weight $SnCl_2 \times 2H_2O$ and 98.88% by weight ethanol.

No. 7

2.5 g of DYNASYLAN® F 8261 (3,3,4,4,5,5,6,6,7,7,8,8,8-tridecafluorooctyl-triethoxysilane), 2.5 g of $H_2O$, 0.5 g of hydrochloric acid (37% by weight HCl/63% by weight $H_2O$), 244.2 g of ethanol and 0.3 g of $SnCl_2 \times 2H_2O$ are stirred in a glass flask at room temperature for 1 h. The composition corresponds to 1.0% by weight DYNASYLAN® F 8261, 1.126% by weight $H_2O$, 0.074% by weight HCl (absolute), 0.12% by weight $SnCl_2 \times 2H_2O$ and 97.68% by weight ethanol.

No. 8 Comparative Example 2.5 g of DYNASYLAN® F 8261 (3,3,4,4,5,5,6,6,7,7,8,8,8-tridecafluorooctyl-triethoxysilane), 2.5 g of $H_2O$, 0.5 g of hydrochloric acid (37% by weight HCl/63% by weight $H_2O$) and 244.5 g of ethanol are stirred in a glass flask at room temperature for 1 h (aging time). The composition corresponds to 1.0% by weight DYNASYLAN® F 8261, 1.0% by weight $H_2O$, 0.2% by weight HCl (absolute) and 97.80% by weight ethanol.

No. 9

2.5 g of DYNASYLAN® F 8261 (3,3,4,4,5,5,6,6,7,7,8,8,8-tridecafluorooctyl-triethoxysilane), 2.5 g of $H_2O$, 0.5 g of hydrochloric acid (37% by weight HCl/63% by weight $H_2O$), 244.2 g of ethanol and 0.3 g of $AlCl_3 \times 6H_2O$ are stirred in a glass flask at room temperature for 5 h (aging time). The composition corresponds to 1.0% by weight DYNASYLAN® F 8261, 0.126% by weight $H_2O$, 0.074% by weight HCl (absolute), 0.12% by weight $AlCl_3 \times 6H_2O$ and 97.68% by weight ethanol.

No. 10

2.5 g of DYNASYLAN® F 8261 (3,3,4,4,5,5,6,6,7,7,8,8,8-tridecafluorooctyl-triethoxysilane), 2.5 g of $H_2O$, 0.5 g of hydrochloric acid (37% by weight HCl/63% by weight $H_2O$), 244.2 g of ethanol and 0.3 g of $FeCl_3 \times 6H_2O$ are stirred in a glass flask at room temperature for 1 h (aging time). The composition corresponds to 1.0% by weight DYNASYLAN® F 8261, 0.126% by weight $H_2O$, 0.074% by weight HCl (absolute), 0.12% by weight $FeCl_3 \times 6H_2O$ and 97.68% by weight ethanol.

Treatment of Glass Window Panes

Coating Operation

The solutions are used after various aging times (see Table 4). The panes are cleaned with isopropanol and dipped in the formulation for 5 minutes. Alternatively, the formulation is applied by polishing with paper cloths. After the excess solution has dripped off, the coated samples are after treated at 150° C. for 1 h.

Checking of the Water Resistance

The coated panes are boiled in distilled $H_2O$ for 5 hours.
The hydrophobic/oleophobic properties are examined by measuring the static wetting angle. The wetting angles are measured a number of times at different points on both surfaces, as shown below in Table 4.

TABLE 4

Comparative summary of the coating experiments relating to Examples D6 to D10

| Composition No. (Aging Time) {Application} | Mean static wetting angle ($H_2O$) before boiling test {°} | Mean static wetting angle ($H_2O$) after 5-h boiling test {°} |
| --- | --- | --- |
| No. 6 (1 h) {dipped} | 62 | 31 |
| No. 6 (1 h) {polished} | 77 | 45 |
| No. 7 (1 h) {dipped} | 94 | 57 |
| No. 7 (1 h) {polished} | 94 | 66 |
| No. 7 (5 h) {dipped} | 92 | 78 |
| No. 7 (72 h) {dipped} | 96 | 89 |
| No. 8 (1 h) {dipped} | 76 | 66 |
| No. 8 (24 h) {dipped} | 92 | 73 |
| No. 9 (1 h) {dipped} | 86 | 82 |
| No. 9 (24 h) {dipped} | 95 | 91 |
| No. 10 (1 h) {dipped} | 81 | 82 |
| No. 10 (24 h) {dipped} | 94 | 98 |

EXAMPLE E

Stability of Fluoroalkylsilane-based Compositions

No. 11

5.0 g of DYNASYLAN® F 8261 (3,3,4,4,5,5,6,6,7,7,8,8,8-tridecafluorooctyl-triethoxysilane), 1.0 g of hydrochloric acid (37% by weight HCl/63% by weight $H_2O$), 493.5 g of ethanol and 0.5 g of $SnCl_2 \times 2H_2O$ are stirred in a glass flask at room temperature for a number of hours. The composition corresponds to 1.0% by weight DYNASYLAN® F 8261, 0.126% by weight $H_2O$, 0.074% by weight HCl (absolute), 0.1 % by weight $SnCl_2 \times 2H_2O$ and 98.7% by weight ethanol.

For long-term experiments, the solution is kept in a sealed glass flask at room temperature.

The glass window panes are each cleaned with isopropanol beforehand and then treated by dipping them into the solution for 20 minutes. After the excess solution has drained off the panes are after treated in a laboratory drying cabinet at 150° C. for 1 hour. The hydrophobic/oleophobic properties are tested in each case by measuring the static wetting angle. The results are summarized in Table 5. They show that even after a storage period of 6 months the composition 5 displays the desired properties outstandingly.

TABLE 5

Comparative summary of the results of investigation into the stability of Composition No. 11

| Age of Composition 11 in months | Static wetting angle {°} (after coating) | Static wetting angle {°} (after 5 h in $H_2O$ at 100° C.) |
| --- | --- | --- |
| 0* | 93 | 90 |
| 1 | 104 | 72 |
| 2 | 97 | 77 |
| 3 | 99 | 78 |
| 4 | 101 | 86 |
| 5 | 103 | 84 |
| 6 | 97 | 86 |

*After 5 hours

No. 12

5.0 g of DYNASYLAN® F 8261 (3,3,4,4,5,5,6,6,7,7,8,8,8-tridecafluorooctyl-triethoxysilane), 1.0 g of hydrochloric acid (37% by weight HCl/63% by weight $H_2O$), 493.5 g of isopropanol and 0.5 g of $SnCl_2 \times 2H_2O$ are stirred in a glass flask at room temperature for a number of hours. The composition corresponds to 1.0% by weight DYNASYLAN® F 8261, 0.126% by weight $H_2O$, 0.074% by weight HCl (absolute), 0.1% by weight $SnCl_2 \times 2H_2O$ and 98.7% by weight isopropanol.

For long-term experiments, the solution is kept in a sealed glass flask at room temperature.

The glass window panes are each coated by polishing with a paper cloth for 2 minutes. There is no further thermal aftertreatment. The hydrophobic/oleophobic properties are tested in each case by measuring the static wetting angle. The results are summarized in Table 6. They show that even after a storage period of 5 months the composition displays the desired properties outstandingly.

TABLE 6

Comparative summary of the results of investigation into the stability of Composition No. 12

| Age of Composition 12 in months | Static wetting angle {°} (after coating) | Static wetting angle {°} (after 5 h in $H_2O$ at 100° C.) |
| --- | --- | --- |
| 0* | 101 | 88 |
| 1 | 100 | 86 |
| 2 | 102 | 71 |
| 3 | 98 | 90 |
| 4 | 101 | 88 |
| 5 | 97 | 96 |

*After 3 days

The disclosure of German priority patent application 19904132.6, filed Feb. 3, 1999, is hereby incorporated by reference.

Obviously, numerous modifications and variations of the present invention are possible in light of the above teachings. It is therefore to be understood that within the scope of the appended claims, the invention may be practiced otherwise than as specifically described herein.

What is claimed is:

1. A composition comprising at least one organofluorine-functional silane and/or siloxane, at least one mineral acid and at least one metal salt of aluminum(III), tin(II), tin(IV), iron(III) or titanium(III), wherein said metal salt is a chloride, nitrate, sulfate, hydrogen sulfate, hydrogen phosphate or dihydrogen phosphate.

2. The composition as claimed in claim 1, wherein the metal salt is present in an amount from 0.01 to 10% by weight, based on the composition.

3. The composition as claimed in claim 2, wherein the mineral acid is present in an amount from 0.001 to 5% by weight, based on the composition.

4. The composition as claimed in claim 3, which additionally comprises solvent and/or dispersant.

5. The composition as claimed in claim 4, wherein the organofluorine-functional silane and/or siloxane is present in an amount from 0.01 to 10% by weight, based on the composition.

6. A process for preparing a composition as claimed in claim 1 comprising mixing, optionally partially hydrolyzing, and, optionally condensing at least one organofluorine-functional silane and, optionally, further organofunctional silanes in the presence of water, at least one mineral acid and at least one metal salt of aluminum(III), tin(II), tin(IV), iron(III) or titanium(III), wherein said metal salt is a chloride, nitrate, sulfate, hydrogen sulfate, hydrogen phosphate or dihydrogen phosphate.

7. The process as claimed in claim 6, wherein said at least one organofluorine functional silane and/or siloxane is a silane of the formula (I)

in which X is chloro or a group RO and R is a linear or branched alkyl radical of 1 to 4 carbon atoms, $R^1$ is a linear, branched or cyclic alkyl group of 1 to 8 carbon atoms, n=0 or 2 and y=0 or 1 or 2, and m is from 0 to 18.

8. The process as claimed in claim 7, wherein the metal salt is employed in solid or liquid or dissolved form.

9. The process as claimed in claim 6, wherein said metal salt is a aluminum(III) chloride, tin(II) chloride, tin(IV) chloride, titanium (III) chloride or iron(III) chloride.

10. The process as claimed in claim 9, wherein said mineral acid is hydrogen chloride, nitric acid, phosphoric acid or sulfuric acid.

11. The process as claimed in claim 10, wherein the metal salt is present in an amount of from 0.01 to 10% by weight, based on the composition.

12. The process as claimed in claim 11, wherein the mineral acid is present in an amount of from 0.01 to 10% by weight, based on the composition.

13. The process as claimed in claim 12, wherein the mineral acid is present in concentrated or aqueous form.

14. The process as claimed in claim 13, wherein water is present in an amount of from 1 ppm by weight to 2% by weight, based on the composition.

15. The process as claimed in claim 14, wherein the silane component is introduced initially and the metal salt, mineral acid and, optionally, water components are added simultaneously or consecutively.

16. The process as claimed in claim 15, wherein the mixing, hydrolysis and/or condensation of the silane component takes place in a solvent or dispersant or in a solvent or dispersant mixture.

17. A process comprising coating a surface with the composition as claimed in claim 1.

18. The process as claimed in claim 17, wherein the surface is wood, natural fiber, metal, metal oxide, filler, pigment, glass, ceramic, enamel, plastic, natural stone, synthetic stone, marble, concrete or bitumen.

19. A surface-modified substrate made by coating said substrate with a composition as claimed in claim 1.

20. The surface-modified substrate as claimed in claim 19, wherein the coating is 0.1 nm to 1000 µm thick.

* * * * *

UNITED STATES PATENT AND TRADEMARK OFFICE
CERTIFICATE OF CORRECTION

PATENT NO.    : 6,361,871 B1
DATED         : March 26, 2002
INVENTOR(S)   : Jenkner et al.

It is certified that error appears in the above-identified patent and that said Letters Patent is hereby corrected as shown below:

<u>Title page,</u>
Item [75], should read as follows:

-- 75] Inventors: Peter Jenkner, Rheinfelden, Roland Edelmann, Wehr; Albert-Johannes Frings; Michael Horn, both of Rheinfelden; Ralf Laven, Schworstadt; Helmut Mack; Jaroslaw Monkiewicz, both of Rheinfelden; Burkhard Standke, Lorrach; Eckhard Just, Rheinfelden, all of (DE) --

Item [73], should read as follows:

-- [73] Assignee: Degussa AG, Duesseldorf (DE) --

Signed and Sealed this

First Day of October, 2002

*Attest:*

JAMES E. ROGAN
*Attesting Officer*          *Director of the United States Patent and Trademark Office*